United States Patent
Wu et al.

(10) Patent No.: US 10,206,176 B2
(45) Date of Patent: Feb. 12, 2019

(54) EFFICIENT CODING SWITCHING AND MODEM RESOURCE UTILIZATION IN WIRELESS COMMUNICATION SYSTEMS

(71) Applicant: MediaTek Inc., Hsinchu (TW)

(72) Inventors: Wei-De Wu, Hsinchu (TW); Pei-Kai Liao, Nantou County (TW); Hsuan-Li Lin, Taipei (TW); Shiang-Jiun Lin, Hsinchu County (TW); Wei-Jen Chen, Taipei (TW); Li-Chuan Tseng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/697,423

(22) Filed: Sep. 6, 2017

(65) Prior Publication Data
US 2018/0070302 A1  Mar. 8, 2018

Related U.S. Application Data

(60) Provisional application No. 62/383,701, filed on Sep. 6, 2016.

(51) Int. Cl.
*H04B 1/38* (2015.01)
*H04W 52/02* (2009.01)
*H04L 5/00* (2006.01)

(52) U.S. Cl.
CPC .......... *H04W 52/028* (2013.01); *H04L 5/005* (2013.01); *H04L 5/0039* (2013.01);
(Continued)

(58) Field of Classification Search
CPC .... H04W 52/028; H04L 5/0039; H04L 5/005; H04L 5/0051
(Continued)

(56) References Cited

U.S. PATENT DOCUMENTS 6,075,814 A * 6/2000 Yamano .................. H04L 12/10
                                              375/222
7,283,492 B2 * 10/2007 Malladi ................... H04L 13/00
                                              370/310
(Continued)

FOREIGN PATENT DOCUMENTS

CN           1399197 A     2/2003
CN         103187066 A     7/2013
EP           1047217 A2   10/2000

OTHER PUBLICATIONS

State Intellectual Property Office, International Search Report and Written Opinion, PCT/CN2014/100737.

*Primary Examiner* — April G Gonzales
(74) *Attorney, Agent, or Firm* — Han IP PLLC; Andy M. Han (57) ABSTRACT

Concepts and examples pertaining to efficient coding switching and modem resource utilization in wireless communication systems are described. A processor of a modem of a user equipment (UE), configured with at least a first-capacity decoder and at least a second-capacity decoder, receives a common virtual carrier (CVC), a dedicated virtual carrier (DVC), or both. The CVC contains common information shared by multiple UEs, control information for the UE, and/or data information related to first data destined for the UE. The DVC contains control information for the UE, the first data, or a combination thereof. The first-capacity decoder decodes data of a small size up to a low data rate. The second-capacity decoder decodes data of a large size up to a high data rate. The processor determines whether to decode the first data using the first-capacity decoder or the second-capacity decoder based on the data information in the CVC.

20 Claims, 5 Drawing Sheets

(52) U.S. Cl.
CPC ....... *H04L 5/0051* (2013.01); *H04W 52/0216* (2013.01); *H04W 52/0219* (2013.01); *H04W 52/0229* (2013.01); *H04L 5/001* (2013.01); *H04L 5/0055* (2013.01)

(58) Field of Classification Search
USPC ........................................................ 455/574
See application file for complete search history.

(56) References Cited

U.S. PATENT DOCUMENTS

| | | | | |
|---|---|---|---|---|
| 7,463,592 | B2* | 12/2008 | Poncini | H04W 24/00 370/252 |
| 7,536,167 | B2* | 5/2009 | Gollnick | G08C 17/02 455/343.4 |
| 7,630,687 | B2* | 12/2009 | Madhavan | H04L 1/0001 455/63.1 |
| 7,664,465 | B2* | 2/2010 | Shen | H04L 1/0002 370/252 |
| 7,873,343 | B2* | 1/2011 | Gollnick | G06F 1/1626 455/343.3 |
| 8,233,915 | B2* | 7/2012 | Paulson | G01S 19/25 370/311 |
| 8,363,624 | B2* | 1/2013 | Blanz | H04L 1/0025 370/335 |
| 8,688,122 | B2* | 4/2014 | Mutya | H04W 52/0241 455/436 |
| 8,826,093 | B2* | 9/2014 | Walker | H04L 1/0045 370/242 |
| 8,914,048 | B2* | 12/2014 | Montojo | H04L 5/0053 455/458 |
| 8,996,078 | B2* | 3/2015 | Castor | G06F 1/3215 455/574 |
| 9,007,888 | B2* | 4/2015 | Sambhwani | H04L 1/1887 370/216 |
| 9,386,627 | B1* | 7/2016 | Oroskar | H04W 76/10 |
| 2011/0053603 | A1* | 3/2011 | Luo | H04L 5/0007 455/450 |
| 2011/0275403 | A1* | 11/2011 | Chen | H04W 52/146 455/522 |
| 2012/0028655 | A1* | 2/2012 | Mueck | H04W 88/06 455/456.6 |
| 2012/0057572 | A1* | 3/2012 | Evans | H04W 88/085 370/338 |
| 2012/0201226 | A1* | 8/2012 | Sambhwani | H04B 7/022 370/332 |
| 2012/0287868 | A1* | 11/2012 | Sambhwani | H04L 1/1887 370/329 |
| 2013/0229906 | A1* | 9/2013 | Akkarakaran | H04L 5/0044 370/216 |
| 2013/0242826 | A1* | 9/2013 | Black | H04W 52/0229 370/311 |
| 2015/0208366 | A1* | 7/2015 | Papasakellariou | H04W 52/244 370/311 |
| 2015/0304956 | A1* | 10/2015 | Mach | H04W 52/0258 455/574 |
| 2015/0312074 | A1* | 10/2015 | Zhu | H04L 27/2627 370/329 |
| 2015/0365900 | A1* | 12/2015 | Kanamarlapudi | H04W 52/0241 370/311 |
| 2016/0192200 | A1* | 6/2016 | Chin | H04L 43/04 455/405 |
| 2016/0204908 | A1* | 7/2016 | Rafique | H04L 1/203 370/252 |
| 2016/0239057 | A1* | 8/2016 | Kocagoez | G06F 1/206 |
| 2017/0141895 | A1* | 5/2017 | Tavildar | H04L 5/0048 |

\* cited by examiner

RECEIVE, BY A PROCESSOR OF A MODEM OF A USER EQUIPMENT (UE) CONFIGURED WITH AT LEAST A FIRST-CAPACITY DECODER AND AT LEAST A SECOND-CAPACITY DECODER, A COMMON VIRTUAL CARRIER (CVC), A DEDICATED VIRTUAL CARRIER (DVC), OR BOTH
510

- THE CVC CONTAINS COMMON INFORMATION SHARED BY A PLURALITY OF UEs IN A NETWORK, CONTROL INFORMATION FOR THE UE, DATA INFORMATION RELATED TO FIRST DATA DESTINED FOR THE UE, OR A COMBINATION THEREOF;
- THE DVC CONTAINS CONTROL INFORMATION FOR THE UE, THE FIRST DATA, OR A COMBINATION THEREOF;
- THE FIRST-CAPACITY DECODER IS CAPABLE OF DECODING DATA OF A FIRST SIZE UP TO A FIRST DATA RATE;
- THE SECOND-CAPACITY DECODER IS CAPABLE OF DECODING DATA OF A SECOND SIZE UP TO A SECOND DATA RATE;
- THE SECOND SIZE IS GREATER THAN THE FIRST SIZE; AND
- THE SECOND DATA RATE IS GREATER THAN THE FIRST DATA RATE

DETERMINE, BY THE PROCESSOR, WHETHER TO DECODE THE FIRST DATA USING THE FIRST-CAPACITY DECODER OR TO DECODE THE FIRST DATA USING THE SECOND-CAPACITY DECODER BASED ON THE DATA INFORMATION IN THE CVC
520

FIG. 5

EFFICIENT CODING SWITCHING AND MODEM RESOURCE UTILIZATION IN WIRELESS COMMUNICATION SYSTEMS

CROSS REFERENCE TO RELATED PATENT APPLICATION(S)

The present disclosure claims the priority benefit of U.S. Provisional Patent Application No. 62/383,701, filed 6 Sep. 2016, the content of which is incorporated by reference in its entirety.

TECHNICAL FIELD

The present disclosure is generally related to wireless communications and, more particularly, to efficient coding switching and modem resource utilization in wireless communication systems.

BACKGROUND

Unless otherwise indicated herein, approaches described in this section are not prior art to the claims listed below and are not admitted as prior art by inclusion in this section.

In a Long-Term Evolution (LTE)-based wireless communication system, a user equipment (UE) typically performs tasks such as paging monitoring, system information (SI) acquisition, small data reception (e.g., browsing, voice-over-LTE (VoLTE) and the like), and control-channel-only reception. The above-listed tasks can be done with a very compact set of modem computation and memory resources. However, most of modem resources, designed to support a much higher data rate, still need to be enabled to accomplish the above-listed tasks. For example, tasks such as paging monitoring, SI acquisition and small data reception require the enabling of high-throughput multiple-input-multiple-output (MIMO) detector and turbo decoder to demodulate and decode the physical downlink shared channel (PDSCH). For control-channel-only reception, the PDSCH data path still needs to be on standby since the PDSCH availability cannot be known in advance.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

Learning from narrowband Internet of Things (NB-IoT) devices that can finish the above-listed tasks with extreme low power, it is an objective of the present disclosure to provide a scheme that applies a relatively little portion of the modem resources while turning off a relatively big portion of the modem resources in a future $5^{th}$ Generation/New Radio (5G/NR) modem. This concept is herein referred as "network-assisted UE resource switching." The proposed scheme may result in significant improvement in reduction of power consumption.

In one aspect, a method may involve a processor of a modem of a UE, configured with at least a first-capacity decoder and at least a second-capacity decoder, receiving a common virtual carrier (CVC), a dedicated virtual carrier (DVC), or both. The CVC may contain common information shared by a plurality of UEs in a network, control information for the UE, data information related to first data destined for the UE, or a combination thereof. The DVC main contain control information for the UE, the first data, or a combination thereof. The first-capacity decoder may be capable of decoding data of a first data size up to a first data rate. The second-capacity decoder may be capable of decoding data of a second data size up to a second data rate. The second data size may be greater than the first data size, and the second data rate may be greater than the first data rate. The method may also involve the processor determining whether to decode the first data using the first-capacity decoder or to decode the first data using the second-capacity decoder based on the data information in the CVC.

In one aspect, an apparatus may include a modem and a processor coupled to control operations of the modem. The modem may be capable of receiving and transmitting signals representative of information and data. The modem may include at least a first-capacity decoder and at least a second-capacity decoder. The first-capacity decoder may be capable of decoding data of a first data size up to a first data rate. The second-capacity decoder may be capable of decoding data of a second data size up to a second data rate. The second data size may be greater than the first data size, and the second data rate may be greater than the first data rate. The processor may receive, via the modem, a CVC, a DVC, or both. The CVC may contain common information shared by a plurality of UEs in a network, control information for the UE, data information related to first data destined for the UE, or a combination thereof. The DVC main contain control information for the UE, the first data, or a combination thereof. The processor may also determine whether to decode the first data using the first-capacity decoder or to decode the first data using the second-capacity decoder based on the data information in the CVC.

It is noteworthy that, although description provided herein may be in the context of certain radio access technologies, networks and network topologies such as LTE, LTE-Advanced, LTE-Advanced Pro, 5th Generation (5G), New Radio (NR) and Internet-of-Things (IoT), the proposed concepts, schemes and any variation(s)/derivative(s) thereof may be implemented in, for and by other types of radio access technologies, networks and network topologies. Moreover, although various examples described herein are in the context of wireless communications, the proposed concepts, schemes and any variation(s)/derivative(s) thereof may be applicable to communications via one or more wired mediums where suitable. Furthermore, although various examples described herein are directed to decoders, the proposed concepts, schemes and any variation(s)/derivative(s) thereof may be applicable to encoders where suitable. Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

The concept and scheme of applying a relatively small portion of the modem resources while turning off a relatively large portion of the modem resources (or "network-assisted UE resource switching") in accordance with the present disclosure may involve a number of aspects. Specifically, a common coding is introduced for downlink control and broadcast channel that may also be applied to paging monitoring, SI acquisition and data channels with small amount of data. Regarding the data channel, a proper coding switching mechanism is introduced to avoid frequency and rapid decoder switching within a short time interval and minimize extra packet error due to decoder switching. For instance, a semi-static approach via some higher-layer signaling may be preferred. Moreover, a proper data scheduling control is introduced to ensure high-throughput decoder and large portion of the modem resources are seldom applied. There term "high-layer signaling" refers to signaling between a network and a UE at one or more of the higher layers in the Open Systems Interconnection (OSI) model, such as the application layer, presentation layer, session layer and/or transport layer.

According to the present disclosure, a common coding scheme may be applied to control channel, broadcast channel, paging channel and system information. The coding scheme may be performance-effective over small to medium length of information bits (e.g., ten to one thousand bits) and may be subject to similar complexity and latency with respect to a LTE tail-biting convolutional codes (TBCC) Viterbi decoder. When applying control channel coding to data channels, adaptation may be necessary to minimize complexity increment for the control decoder to decode data channels. For instance, constraints may be imposed on code block size. Additionally, the maximum amount of data of all the data channels switching to control channel coding may be limited. The maximum amount of data may be part of UE category parameters. One or more modifications to the control channel coding to assist in reduced-complexity decoding may be provided. Using Polar code as an example, an extra cyclic redundancy check (CRC) may be inserted at the end of every length-$N/2^m$ segment of N output code bits to effectively break the size-N Polar code decoding into multiple decoding over size-$N/2^m$ Polar code which requires $\frac{1}{2^m}$ resource as decoding size-N Polar code. For data channel robustness, hybrid automatic repeat request incremental redundancy (HARQ IR) and similar schemes may be supported in accordance with the present disclosure. When a different channel coding is selected for data channel with small data amount (as well as for paging and system information), a corresponding decoder chosen for the task may possess similar complexity and latency as a TBCC Viterbi decoder.

Under the proposed scheme and the "network-assisted UE resource switching" concept, as a general rule, frequent and rapid decoder switching within a relatively short time interval may be avoided. For instance, a minimum of one or more subframe between adjacent coding type switching may be required. For each coding type switching, a proper time interval may be reserved (e.g., ≥100 μs) for turning on a decoder. Moreover, coding switching by a semi-static way via higher-layer signaling may be preferred. The semi-static way of higher-layer signaling may indicate mapping of a default coding type to a resource/carrier, which may be a virtual resource/carrier. Alternatively or additionally, the semi-static way of higher-layer signaling may indicate a mechanism of coding type switching for one, some or all resources/carriers, which may include virtual resources/carriers. Faster physical layer (PHY) signaling for enabling and disabling the (virtual) resources/carriers may be utilized to better balance flexibility in data scheduling and UE low-power performance.

It is noteworthy that, under the proposed scheme, it is a requirement that a network align with a UE regarding which encoder to be applied and which decoder to be used. Current New Radio assumes the network and UE are aligned in codeword generation, but this may result in very dynamic change for each data transmission duration. Since UE resource switching requires time to enter or leave a low-power state for the UE, the dynamic change would force the UE to keep the resource on standby in a high-power state. This would be undesirable and would defeat the purpose of the proposed scheme. Thus, to fulfill the alignment requirement and allow UE resource to enter the low-power state for a longer period of time, the present disclosure provides two approaches as described below.

Figure 3:
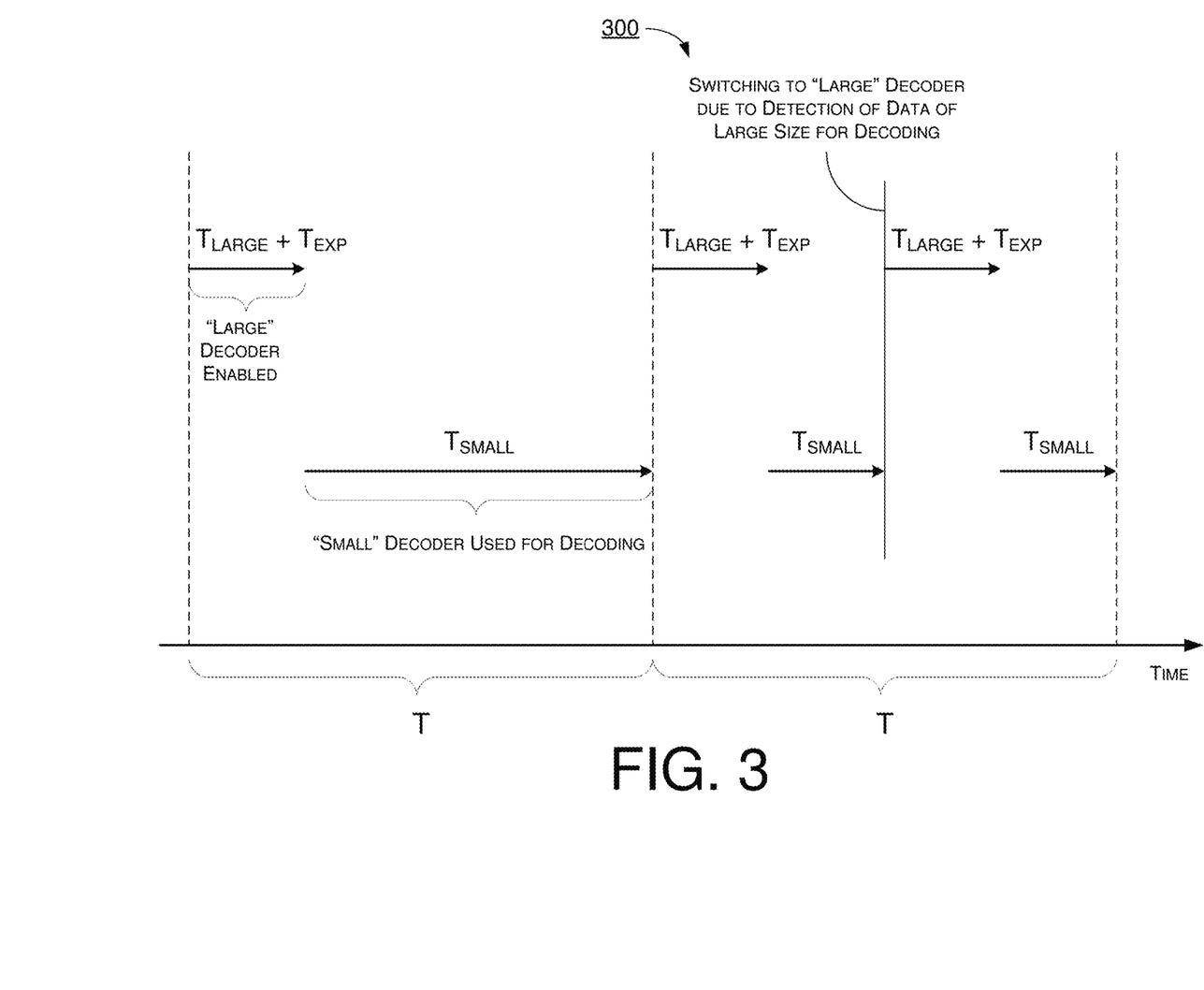
FIG. 3 is a diagram of an example scenario of coding switching in accordance with an implementation of the present disclosure.

A first approach in accordance with the present disclosure may involve semi-static signaling combined with virtual carrier configuration. The virtual carrier configuration may, for example and without limitation, including the following: (1) explicit command for UE decoder switching, and (2) implicit and semi-static information so that the UE can derive the resource demand and decide resource switching. A second approach in accordance with the present disclosure may involve a semi-static mechanism to minimize configuration. An example of the second approach is shown in FIG. 3, and thus will be described below along with the description of FIG. 3.

The concept of virtual resources/carriers, as well as flexible utilization of the virtual carrier concept and physical layer signaling, is described below.

Under the proposed scheme and the "network-assisted UE resource switching" concept, a virtual carrier (VC) refers to a block of physically contiguous radio frequency (RF) resources within a component carrier. Multiple VCs within a component carrier may share a same cell identifier (ID). Alternatively or additionally, multiple VCs within a component carrier may have different cell IDs.

Under the proposed scheme and the "network-assisted UE resource switching" concept, a downlink (DL) common virtual carrier (CVC) refers to a VC used for network entry, idle mode operation, radio resource management (RRM) measurement, and data service. In some implementations, a DL CVC may include beacon signals, system information, common PHY control information, and dedicated control information and data. In some implementations, a physical location of a DL CVC may be at any frequency location of a component carrier. In some implementations, the bandwidth of a DL CVC may be broadcasted in system information. In some implementations, a component carrier may contain a single CVC or multiple CVCs.

Under the proposed scheme and the "network-assisted UE resource switching" concept, a DL dedicated virtual carrier (DVC) refers to a VC solely used for data service. In some implementations, a DL DVC may include control information and/or data and no other information (e.g., no beacon signals and no broadcasting of system information). In some implementations, the bandwidth and physical location of a DL DVC may be configurable by radio resource control (RRC)-layer signaling.

Under the proposed scheme and the "network-assisted UE resource switching" concept, an uplink (UL) common virtual carrier (CVC) refers to a VC that includes common PHY control information for random access channel (RACH). In some implementations, a UL CVC may include dedicated PHY control information and/or data as well as sounding reference signal(s). The dedicated PHY control information may be used at least for hybrid automatic repeat request-acknowledgement (HARQ-ACK) and channel state information (CSI) feedback. In some implementations, the bandwidth and physical location of a UL CVC may be broadcasted in system information.

Under the proposed scheme and the "network-assisted UE resource switching" concept, a UL dedicated virtual carrier (DVC) refers to a VC that includes dedicated PHY control information and/or data as well as sounding reference signal(s), but there is no common PHY control for RACH. The dedicated PHY control information may be used at least for HARQ-ACK and CSI feedback. In some implementations, the bandwidth and physical location of a UL DVC may be configurable by RRC-layer signaling.

Under the proposed scheme and the "network-assisted UE resource switching" concept, configuration of VCs, or VC configuration, may be signaled to a UE via RRC-layer signaling per component carrier. In some implementations, VC configuration of parameters such as bandwidth and physical location may be UE-specific and carrier-specific. In some implementations, the configured bandwidth and physical location for a UE may be different between DL and UL transmissions. The switching on and off of VC may be signaled via dedicated PHY signaling with minimal activation latency. For instance, dedicated PHY signaling may be in a number of subframes starting from subframe #n to subframe #n+N+K, where K may be 1. The radio frequency (RF) switching time from one VC to another VC may be around 140 μs or two orthogonal frequency division multiplexing (OFDM) symbols in an LTE network. In some implementations, maximal latency may be 0.25 ms for 60 kHz subcarrier spacing. For LTE carrier aggregation (CA), maximal activation latency may be 24 ms or 32 ms, depending on whether it is a warm start (24 ms) or a cold start (32 ms).

Under the proposed scheme and the "network-assisted UE resource switching" concept, when in a connected mode, a UE may operate in the following scenarios in a primary cell ($P_{cell}$): (1) CVC only, and (2) both CVC and DVC. Moreover, when in the connected mode, a UE may operate in the following scenarios in a secondary cell ($S_{cell}$): (1) CVC only, (2) both CVC and DVC, and (3) DVC only. Furthermore, when in an idle mode, a UE may operate in a $P_{cell}$ in the scenario of CVC only.

In an event that the UE receives CVC but not DVC, coding switching/resource switching may be related to control information and/or semi-static configuration in the CVC. In an event that the UE receives at least one DVC, coding switching/resource switching may be dependent on control information and/or semi-static configuration in the DVC(s). Alternatively or additionally, the switching may be based on the total data amount regarding DVC(s) as well as CVC if present (received by the UE) at the same time. Alternatively, the switching may be dependent on the instantaneous data size in the DVC(s). In cases where there is no restriction and the data size is greater than a maximum capacity of a small-capacity decoder, then a large-capacity decoder may be required to decode the DVC data.

Under the proposed scheme, to have the UE effectively stay in the low-power state, explicit or implicit restriction on data size in the semi-static configurations of CVC and DVC(s) may be applied. As an example, an implicit restriction may specify a maximal modulation order and/or a maximal spatial layer number in a virtual carrier configuration. As another example, an explicit restriction may indicate whether the small-capacity decoder or the large-capacity decoder is to be used per virtual carrier.

Moreover, in 5G/NR, there are two types of decoders, namely control decoders and data decoders. Under the proposed scheme, small-capacity decoders and large-capacity decoders are data decoders, and thus the switching between a small-capacity decoder and a large-capacity decoder described herein is in the context of data decoder switching.

Figure 1:
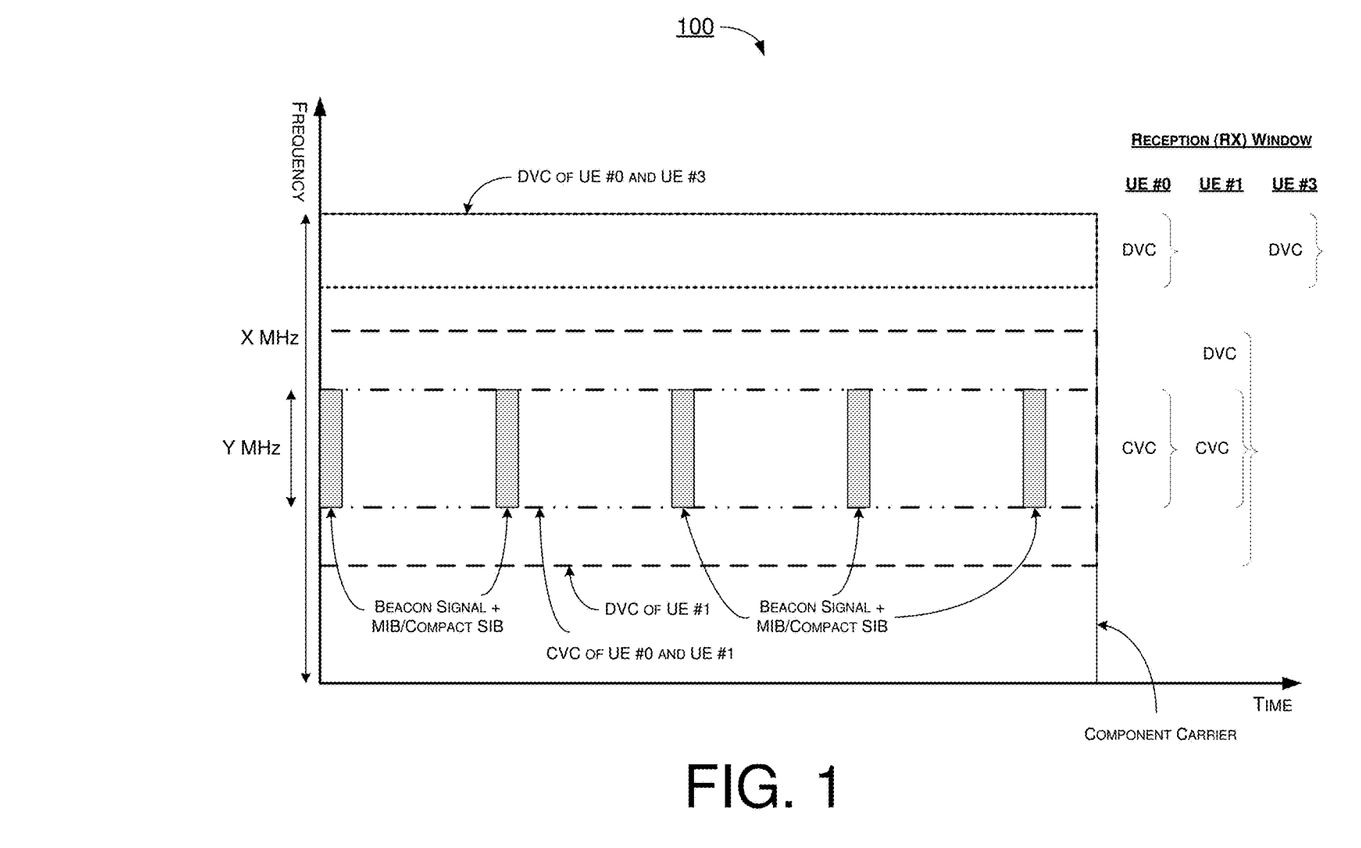
FIG. 1 is a diagram of an example scenario depicting virtual carrier concept in accordance with an implementation of the present disclosure.

FIG. 1 illustrates an example scenario 100 depicting the virtual carrier concept in accordance with an implementation of the present disclosure. For illustrative purposes and without limitation, various VCs for a number of UEs (e.g., UE #0, UE #1 and UE #3) are depicted in scenario 100. As shown in FIG. 1, within a component carrier, there may be multiple VCs configured for a given UE. Moreover, the radio resources of multiple VCs may overlap with each other.

In scenario 100, a CVC configured for UE #0 and UE #1 overlaps with a DVC configured for UE #1. The CVC for UE #0 and UE #1 as shown in FIG. 1 includes a number of beacon signals as well as a number of master information blocks (MIB) and/or compact system information blocks (SIB). Also, in scenario 100, a DVC is configured for both UE #0 and UE #3. In scenario 100, X may be 200 (for 200 MHz) and Y may be 20 (for 20 MHz). As denoted in FIG. 1, in terms of reception (RX) window of each UE, UE #0 is to receive a CVC and a DVC in the component carrier. Similarly, UE #1 is to receive a CVC and a DVC in the component carrier. Moreover, UE #3 is to receive a DVC in the component carrier.

Under the proposed scheme and the "network-assisted UE resource switching" concept, a UE may include at least one small-capacity decoder and at least one large-capacity decoder. A small-capacity decoder in accordance with the present disclosure may be, for example and without limitation, a Turbo decoder, a TBCC Viterbi decoder or a Polar decoder supporting relatively lower data rates. The small-capacity decoder may include at least a channel decoder for common and dedicated PHY control and data packets with relatively smaller maximal transport block size (e.g., ≤1000 bits). A large-capacity decoder in accordance with the present disclosure may be, for example and without limitation, a Turbo decoder or a low-density parity-check (LPDC) decoder supporting relatively higher data rates. The large-capacity decoder may include at least a channel decoder capable of decoding data with relatively larger maximal transport block size. The large-capacity decoder may be used for an exclusive transport block size (e.g., 1001~8000 bits) in conjunction with the small-capacity decoder. The large-capacity decoder may also be used for an overlapping transport block size (e.g., up to 8000 bits) in conjunction with the small-capacity decoder.

According to the present disclosure, the small-capacity decoder may be applied by a UE in a CVC by default, and the UE may be configured by a higher layer to apply the large-capacity decoder for data decoding when necessary. Moreover, either the small-capacity decoder or the large-capacity decoder may be configured to be applied by the UE for data decoding in a DVC, depending on the maximal supported transport block size in the DVC.

Figure 2:
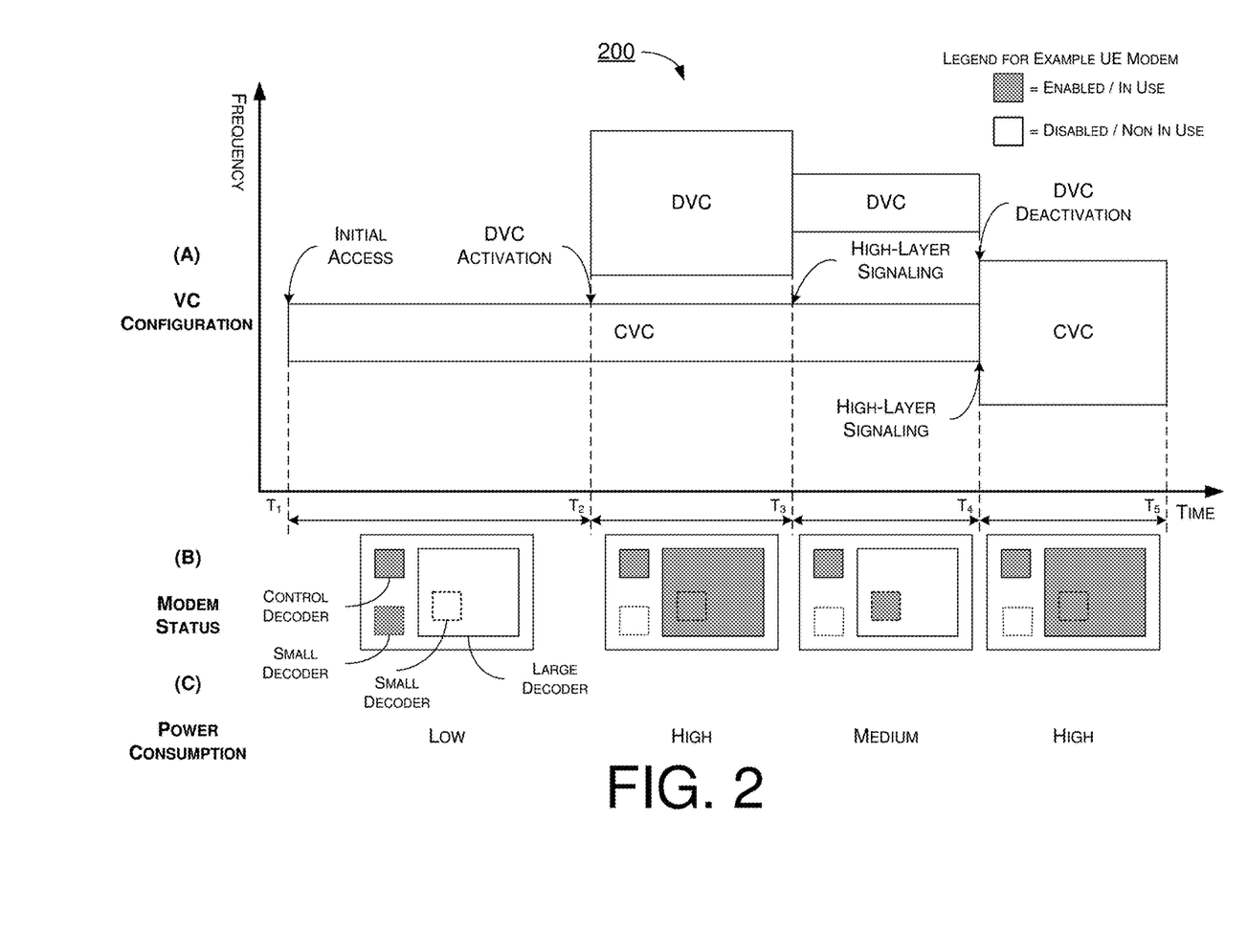
FIG. 2 is a diagram of an example scenario depicting "network-assisted UE resource switching" concept in accordance with an implementation of the present disclosure.

FIG. 2 illustrates an example scenario 200 depicting the "network-assisted UE resource switching" concept in accordance with an implementation of the present disclosure. Part (A) of FIG. 2 depicts an example of VC configuration. Part (B) of FIG. 2 depicts of modem status of a UE corresponding to changes in VC configuration. Part (C) of FIG. 2 denotes the power consumption by a modem of a UE. In part (B) of FIG. 2, a shaded square represents a decoder that is enabled or otherwise in use, and a non-shaded square represents a decoder that is disabled or otherwise not in use.

Under the proposed scheme, the UE may include a control decoder, a large-capacity decoder, and one or more small-capacity decoders. In the example shown in FIG. 2, the UE has a control decoder, and the control decoder is enabled or otherwise in use between time $T_1$ and time $T_5$ to process control information contained in the various CVCs and DVCs received by the UE. In some implementations, at least one of the one or more small-capacity decoders may either share a common part of physical resource(s) (e.g., circuit(s)) with the large-capacity decoder or be a portion of the large-capacity decoder. Alternatively or additionally, at least one of the one or more small-capacity decoders may be physically separate from and without sharing physical resource with the large-capacity decoder. In the example shown in FIG. 2, for illustrative purposes and without limitation, the UE has a small-capacity decoder, which is separate from the large-capacity decoder, as well as another small-capacity decoder that is a portion of the large-capacity decoder. For simplicity, each small-capacity decoder in FIG. 2 is denoted as "small decoder", and the large-capacity decoder is denoted in FIG. 2 as "large decoder." The use of dotted lines to represent the small-capacity decoders in FIG. 2 is because there may be a single small-capacity decoder in the UE, and the single small-capacity decoder may be either separate from the large-capacity decoder or a portion of (e.g., embedded in) the large-capacity decoder.

Referring to FIG. 2, initial access occurs at time $T_1$ for the UE to receive information via a CVC in wireless communications with a network such as, for example and without limitation, a LTE network, a LTE-Advanced network, a LTE-Advanced Pro network, a 5G network, a NR network or an IoT network. For downlink transmission (e.g., reception by the UE), the CVC may include beacon signals, system information, common PHY control information, and dedicated control information and data. The reception for the CVC between time $T_1$ and time $T_2$ does not require high data rates and, thus, a small amount of modem resources can achieve such task. As denoted in part (C) and shown in part (B) of FIG. 2, the power consumption by the UE is low between time $T_1$ and time $T_2$, and thus a small-capacity decoder (the one represented by a shaded small square in dotted line in FIG. 2) in the modem is utilized to receive the CVC.

At time $T_2$, in addition to the existing CVC, activation of a DVC occurs. Thus, between time $T_2$ and time $T_3$, the UE simultaneously receives the existing CVC and the DVC. For downlink transmission (e.g., reception by the UE), the DVC may include control information and/or data. The reception for the DVC between time $T_2$ and time $T_3$ requires high data rates and, thus, a large amount of modem resources is needed to achieve such task. As denoted in part (C) and shown in part (B) of FIG. 2, the power consumption by the UE is high between time $T_2$ and time $T_3$, and thus a large-capacity decoder (represented by a shaded large square in solid line in FIG. 2) in the modem is utilized to receive the CVC and the DVC.

At time $T_3$, the original DVC ends and a new DVC begins while the original CVC continues. Thus, between time $T_3$ and time $T_4$, the UE simultaneously receives the existing CVC and the new DVC. The reception for the new DVC between time $T_3$ and time $T_4$ does not require high data rates and, thus, a small amount of modem resources is needed to achieve such task. As denoted in part (C) and shown in part (B) of FIG. 2, the power consumption by the UE is medium between time $T_3$ and time $T_4$, and thus a small-capacity decoder (the one represented by a shaded small square in dotted line in FIG. 2) in the modem is utilized to receive the CVC and the new DVC. In some implementations, the small-capacity decoder enabled/in use may be a decoder different and physically separate from the large-capacity decoder and the original small-capacity decoder (e.g., for the duration between time $T_1$ and $T_2$). In some implementations, the small-capacity decoder enabled/in use may be a portion of the large-capacity decoder (e.g., for the duration between time $T_3$ and $T_4$), which may be considered as a small-capacity decoder embedded in the large-capacity decoder. Also, as shown in FIG. 2, at time $T_3$ coding switching is done by higher-layer signaling.

At time $T_4$, the original CVC and the new DVC end, with DVC deactivation to end DVC reception, while a new CVC begins. Thus, between time $T_4$ and time $T_5$, the UE receives the new CVC. The reception for the new CVC between time $T_4$ and time $T_5$ does require high data rates and, thus, a large amount of modem resources is needed to achieve such task. As denoted in part (C) and shown in part (B) of FIG. 2, the power consumption by the UE is high between time $T_4$ and time $T_5$, and thus the large-capacity decoder in the modem is utilized to receive the new CVC. Also, as shown in FIG. 2, at time $T_4$ coding switching is done by higher-layer signaling.

FIG. 3 illustrates an example scenario 300 of coding switching in accordance with an implementation of the present disclosure. Under the proposed scheme, a higher-layer signaling mechanism may be utilized for coding type switching over one, some or all virtual carriers. In some implementations, the design of coding type switching may be similar to that for discontinuous reception (DRX).

Referring to FIG. 3, each switching period T may contain a time interval having at least one duration of $T_{LARGE}$ plus an expiration duration of $T_{EXP}$ for applying a large-capacity decoder. Outside that time interval, a small-capacity decoder may be applied for the remainder of the period T, which is shown as $T_{SMALL}$ in FIG. 3. For each period T, a UE may determine, based on high-layer signaling, a size of data to be received during that period T. In each period T, the large-capacity decoder may be enabled for the duration of $T_{LARGE}$ and then switched to the small-capacity decoder if no data size larger than the data amount constraint, D, detected after the expiration duration of $T_{EXP}$. If there is still intended data with size larger than D during $T_{EXP}$, then the large-capacity decoder may be used until another period of time of $T_{EXP}$ with no detection of larger data. In some implementations, parameters such as $T_{LARGE}$, $T_{EXP}$ and T may be signaled via high-layer signaling from a network to the UE, and the UE may derive $T_{SMALL}$ (=T−$T_{LARGE}$−$T_{EXP}$) based on the parameters received from the network.

When switching to the small-capacity decoder, the UE may continue to check if an intended data with size larger than D is identified. When an intended data with size larger than D is identified, proper procedure for reserving at least a warm-up time for the large-capacity decoder may be carried out. For instance, the UE may send a non-acknowledgement (NACK) for a current data packet before switching to the large-capacity decoder for at least a duration of $T_{LARGE}$+$T_{EXP}$.

In addition to checking data size larger than D, alternative scheme(s) may be utilized or combined by the UE for enabling the large-capacity decoder. For instance, the UE may check whether a packet or transport block (TB) CRC of a previous packet is descrambled by a specific sequence.

FIG. 3 may be an example where a network signals a semi-static mechanism with parameters $T_{LARGE}$, $T_{EXP}$ and T, as $T_{SMALL}$ can be derived by T−$T_{LARGE}$−$T_{EXP}$. The UE may apply the mechanism and know when the UE is allowed to perform resource switching. It is noteworthy that, although the semi-static mechanism may work optimally with network coordination, the mechanism may also be applied privately by UE alone. For example, the UE may learn and predict the parameters (e.g., by checking whether a packet or TB CRC of a previous packet is descrambled by a specific sequence), and then may apply the mechanism. In an event that a large/small codeword is transmitted when an incorrect type of decoder is utilized by the UE, the UE may report decoding failure to the network, switch to the correct decoder type, and wait for retransmission to recover data.

Illustrative Implementations

Figure 4:
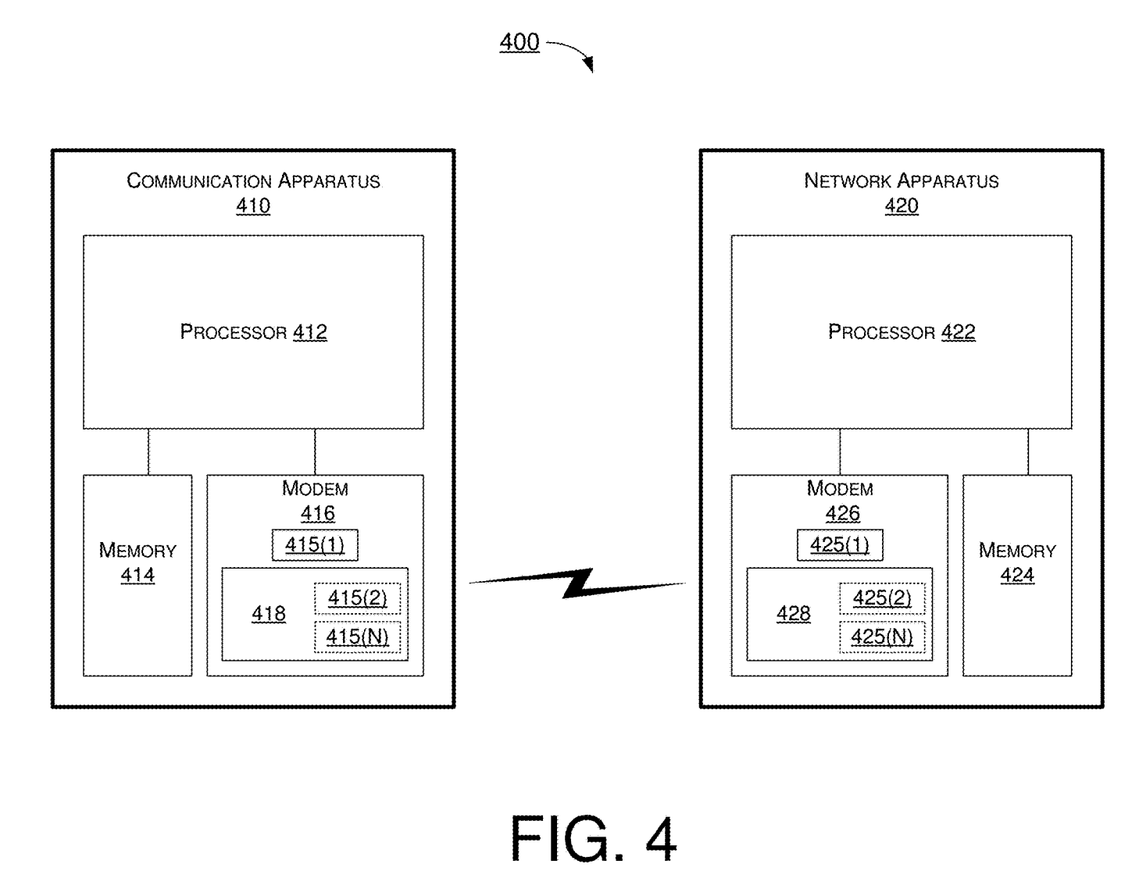
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to efficient coding switching and modem resource utilization in wireless communication systems, including scenarios 100, 200 and 300 described above as well as processes 500 and 600 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, or one or more complex-instruction-set-computing (CISC) processors. In scenarios 100, 200 and 300, communication apparatus 410 may be implemented in or as the UE described in those scenarios. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in a LTE, LTE-Advanced or LTE-Advanced Pro network or in a gNB in a 5G network, an NR network or an IoT network. Alternatively, network apparatus 420 may be implemented in the form of one or more IC chips such as, for example and without limitation, one or more single-core processors, one or more multi-core processors, or one or more CISC processors. In scenarios 100, 200 and 300, network apparatus 420 may be implemented in or as a network node in wireless communication with the UE (e.g., communication apparatus 410). Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to efficient coding switching and modem resource utilization in wireless communication systems in accordance with various implementations of the present disclosure.

In some implementations, communication apparatus 410 may also include a modem 416 coupled to processor 412. Modem 416 may include a transceiver capable of wirelessly transmitting and receiving data. Modem 416 may also include one or more encoders and decoders, such as at least one small-capacity decoder and at least one large-capacity decoder as described herein. In the example shown in FIG. 4, modem 416 includes a number of small-capacity decoders, including at least a control decoder 415(1) and one or more small-capacity decoders 415(2)-415(N), as data decoder(s), where N is a positive integer greater than 1. In the example shown in FIG. 4, modem 416 also includes a large-capacity decoder 418. In some implementations, at least one of small-capacity decoders 415(2)-415(N) is embedded in or otherwise a portion of large-capacity decoder 418. Each of small-capacity decoder 415(2)-415(N) may be capable of decoding data of a first data size (e.g., a relatively smaller size) up to a first data rate (e.g., a relatively lower data rate). The large-capacity decoder 418 may be capable of decoding data of a second data size (e.g., a relatively larger size) up to a second data rate (e.g., a relatively higher data rate). The second data size may be greater than the first data size, and the second data rate may be greater than the first data rate. Each of small-capacity decoder 415(2)-415(N) may be referred as a first-capacity decoder, and the large-capacity decoder 418 may be referred as a second-capacity decoder. Thus, each first-capacity decoder (small-capacity decoder 415(2)-415(N)) may be capable of decoding data of the first data size up to the first data rate. The second-capacity decoder (large-capacity decoder 418) may be capable of decoding data of the second data size up to the second data rate. The second data size may be greater than the first data size, and the second data rate may be greater than the first data rate. In some implementations, small-capacity and large-capacity decoders (e.g., decoders 415(2)-415(N) and 418) may physically share the same physical resources such as hardware logic and/or memory, provided that they are applied in time exclusive manner.

In some implementations, network apparatus 420 may also include a modem 426 coupled to processor 422. Modem 426 may include a transceiver capable of wirelessly transmitting and receiving data. Modem 426 may also include one or more encoders and decoders, such as at least one small-capacity decoder and at least one large-capacity decoder as described herein. In the example shown in FIG. 4, modem 426 includes at least a small-capacity decoder 425(1) and a small-capacity decoder 425(M), where M is a positive integer greater than 1. In the example shown in FIG. 4, modem 426 also includes a large-capacity decoder 428. In some implementations, at least one of small-capacity decoders 425(1)-425(M) is embedded in or otherwise a portion of large-capacity decoder 428. Each of small-capacity decoder 425(1)-425(M) may be capable of decoding data of the first data size up to the first data rate. The large-capacity decoder 428 may be capable of decoding data of the second data size up to the second data rate. Each of small-capacity decoder 425(1)-425(M) may be referred as a first-capacity decoder, and the large-capacity decoder 428 may be referred as a second-capacity decoder. Thus, each first-capacity decoder (small-capacity decoder 425(1)-425(M)) may be capable of decoding data of the first data size up to the first data rate. The second-capacity decoder (large-capacity decoder 428) may be capable of decoding data of the second data size up to the second data rate. The second data size may be greater than the first data size, and the second data rate may be greater than the first data rate. Accordingly, communication apparatus 410 and network apparatus 420 may wirelessly communicate with each other via modem 416 and modem 426, respectively.

In some implementations, communication apparatus 410 may further include a memory 414 coupled to processor 412 and capable of being accessed by processor 412 and storing data therein. In some implementations, network apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

To aid better understanding, the following description of the operations, functionalities and capabilities of each of communication apparatus 410 and network apparatus 420 is provided in the context of a LTE/LTE-Advanced/LTE-Advanced Pro environment in which communication apparatus 410 is implemented in or as a communication apparatus or a UE and network apparatus 420 is implemented in or as a network node of a LTE/LTE-Advanced/LTE-Advanced Pro network.

In some implementations, processor 412 may be coupled to control operations of modem 416. Processor 412 may receive, via modem 416 from network apparatus 420 as a network node of a network, a CVC, a DVC, or both. The CVC may contain common information shared by multiple UEs from the network including communication apparatus 410 as one of the multiple UEs, control information for communication apparatus 410, data information related to first data destined for communication apparatus 410, or a combination thereof, The DVC may contain control information for communication apparatus 410, the first data, or a combination thereof. Processor 412 may also determine whether to decode the first data using the first-capacity decoder or to decode the first data using the second-capacity decoder (large-capacity decoder 418) based on the data information in the CVC.

In some implementations, in determining whether to decode the first data using the first-capacity decoder or to decode the first data using the second-capacity decoder, processor 412 may perform, for each time period of a plurality of consecutive time periods, a number of operations. For instance, processor 412 may enable the second-capacity decoder for a first duration (e.g., $T_{LARGE}$). Processor 412 may also perform at least one of the following: (1) decoding the first data using the second-capacity decoder in response to a determination that a size of the first data is greater than the first data size; (2) disabling the second-capacity decoder at an end of a second duration (e.g., $T_{EXP}$) that follows the first duration in response to a determination that a size of the first data is not greater than the first data size; and (3) continuing to use the second-capacity decoder to decode second data in response to a determination during the second duration that a size of the second data is greater than the first data size.

In some implementations, in determining whether to decode the first data using the first-capacity decoder or to decode the first data using the second-capacity decoder, processor 412 may perform some additional operations. For instance, processor 412 may, following the disabling of the second-capacity decoder at the end of the second duration, determine whether third data, destined for the UE and received by the UE after receiving the first data, has a size greater than the first data size. Processor 412 may also perform either of the following: (1) enabling the second-capacity decoder to decode the third data in response to a determination that there is the third data destined for the UE with a size greater than the first data size; or (2) decoding the third data using the first-capacity decoder in response to a determination that the size of the third data is not greater than the first data size.

In some implementations, processor 412 may be further capable of performing either of the following: (1) enabling a first-capacity decoder (e.g., one of small-capacity decoders 415(2)-415(N)) to decode the first data in response to a determination to decode the first data using the first-capacity decoder based on the data information indicating a size of the first data less than the first data size; or (2) enabling the second-capacity decoder to decode the first data in response to a determination to decode the first data using the second-capacity decoder based on the data information indicating a size of the first data greater than the first data size.

In some implementations, processor 412 may be further capable of performing a number of operations. For instance, processor 412 may receive, via modem 416 from network apparatus 420, a DVC containing the first data destined for communication apparatus 410 as a UE. Processor 412 may also determine whether to decode the DVC using the first-capacity decoder (e.g., small-capacity decoder 415(N)) or to enable the second-capacity decoder (e.g., large-capacity decoder 418) to decode the first data using the second-capacity decoder based on the data information in the CVC. In some implementations, first-capacity decoder may either share a common part of physical resource(s) (e.g., circuit(s)) with the second-capacity decoder or be a portion of the second-capacity decoder.

In some implementations, processor 412 may be further capable of performing other operations. For instance, processor 412 may receive, via modem 416 from network apparatus 420, high-layer signaling indicating a change in the CVC, the DVC, or both. Processor 412 may then adjust utilization of the first-capacity decoder and the second-capacity decoder in response to the receiving of the high-layer signaling. In some implementations, in adjusting the utilization of the first-capacity decoder and the second-capacity decoder, processor 412 may perform some operations. For instance, processor 412 may switch utilization of the second-capacity decoder and the first-capacity decoder by performing either of the following: (1) disabling the second-capacity decoder and enabling the first-capacity decoder to perform decoding using the first-capacity decoder; or (2) enabling the second-capacity decoder and disabling the first-capacity decoder to perform decoding using the second-capacity decoder.

Figure 5:
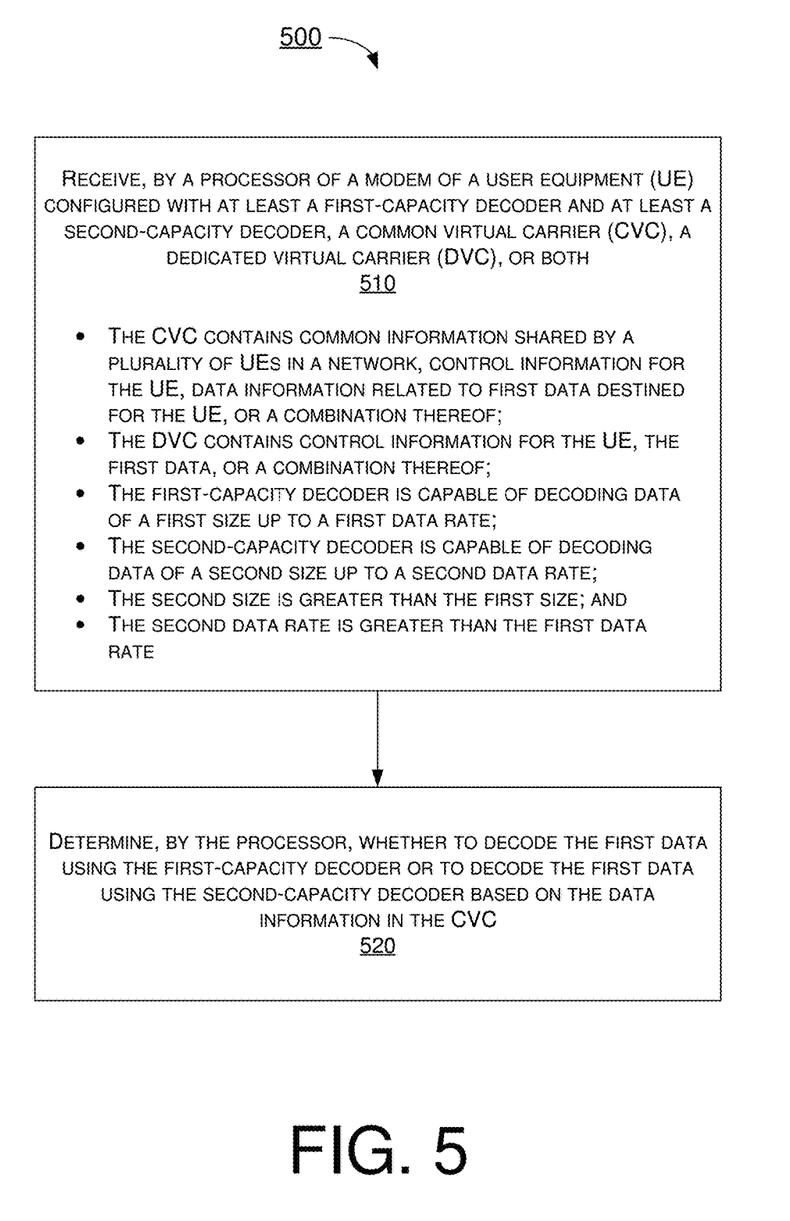
FIG. 5 is a flowchart of an example process in accordance with an implementation of the present disclosure.

FIG. 5 illustrates an example process 500 in accordance with an implementation of the present disclosure. Process 500 may represent an aspect of implementing the proposed concepts and schemes such as one or more of the various schemes described above with respect to scenarios 100, 200 and 300. More specifically, process 500 may represent an aspect of the proposed concepts and schemes pertaining to efficient coding switching and modem resource utilization in wireless communication systems. For instance, process 500 may be an example implementation, whether partially or completely, of the proposed scheme described above for efficient coding switching and modem resource utilization in wireless communication systems. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in apparatus 410 and/or apparatus 420 as well as any variations thereof. Solely for illustrative purposes and without limiting the scope, process 500 is described below in the context of apparatus 410 implemented as a UE. Process 500 may begin at block 510.

At 510, process 500 may involve processor 412 of communication apparatus 410 receiving, via a modem (e.g., modem 416) from a network node (e.g., network apparatus 420) of a network, a CVC, a DVC, or both. The CVC may contain common information shared by multiple UEs from the network including communication apparatus 410 as one of the multiple UEs, control information for communication apparatus 410, data information related to first data destined for communication apparatus 410, or a combination thereof, The DVC may contain control information for communication apparatus 410, the first data, or a combination thereof. The modem may be configured with at least a first-capacity decoder (e.g., small-capacity decoder 415(2)) and at least a second-capacity decoder (e.g., large-capacity decoder 418). The first-capacity decoder may be capable of decoding data of a first data size up to a first data rate. The second-capacity decoder may be capable of decoding data of a second data size up to a second data rate. The second data size may be greater than the first data size, and the second data rate may be greater than the first data rate. Process 500 may proceed from 510 to 520.

At 520, process 500 may involve processor 412 determining whether to decode the first data using the first-capacity decoder or to decode the first data using the second-capacity decoder based on the data information in the CVC.

In some implementations, the CVC may include a block of physically contiguous RF resources within a component carrier. The common information in the CVC may include one or more beacon signals, system information, common physical layer control information, dedicated control information, data, or a combination thereof. The DVC may be configurable by radio resource control (RRC)-layer signaling. Alternatively or additionally, the common information in the CVC may include explicit information related to decoder switching for the UE, implicit and semi-static information used by the UE to derive resource demand and decide resource switching, or a combination thereof.

In some implementations, in determining whether to decode the first data using the first-capacity decoder or to decode the first data using the second-capacity decoder, process 500 may involve processor 412 performing, for each time period of a plurality of consecutive time periods, a number of operations. For instance, process 500 may involve processor 412 enabling the second-capacity decoder for a first duration. Additionally, process 500 may involve processor 412 performing at least one of: (1) decoding the first data using the second-capacity decoder in response to a determination that a size of the first data is greater than the first data size; (2) disabling the second-capacity decoder at an end of a second duration that follows the first duration in response to a determination that a size of the first data is not greater than the first data size; and (3) continuing to use the second-capacity decoder to decode second data in response to a determination during the second duration that a size of the second data is greater than the first data size.

In some implementations, in determining whether to decode the first data using the first-capacity decoder or to decode the first data using the second-capacity decoder, process 500 may involve processor 412 perform a number of operations. For instance, following the disabling of the second-capacity decoder at the end of the second duration, process 500 may involve processor 412 determining whether third data, destined for the UE and received by the UE after receiving the first data, has a size greater than the first data size. Moreover, process 500 may involve processor 412 performing either of the following: (1) enabling the second-capacity decoder to decode the third data in response to a determination that there is the third data destined for the UE with a size greater than the first data size; or (2) decoding the third data using the first-capacity decoder in response to a determination that the size of the third data is not greater than the first data size.

In some implementations, process 500 may involve processor 412 performing additional operations. For instance, process 500 may involve processor 412 performing either of the following: (1) enabling the first-capacity decoder to decode the first data in response to a determination to decode the first data using the first-capacity decoder based on the data information indicating a size of the first data less than the first data size; or (2) enabling the second-capacity decoder to decode the first data in response to a determination to decode the first data using the second-capacity decoder based on the data information indicating a size of the first data greater than the first data size.

In some implementations, process 500 may involve processor 412 performing other operations. For instance, process 500 may involve processor 412 receiving, via modem 416 from network apparatus 420, a DVC containing the first data destined for the UE. Additionally, process 500 may involve processor 412 determining whether to decode the DVC using the first-capacity decoder (e.g., small-capacity decoder 415(N)) or to enable the second-capacity decoder (e.g., large-capacity decoder 418) to decode the first data using the second-capacity decoder based on the data information in the CVC. In some implementations, the first-capacity decoder may either share a common part of physical resource(s) (e.g., circuit(s)) with the second-capacity decoder or be a portion of the second-capacity decoder.

In some implementations, process 500 may involve processor 412 performing other operations. For instance, process 500 may involve processor 412 receiving, via modem 416 from network apparatus 420, high-layer signaling indicating a change in the CVC, the DVC, or both. Moreover, process 500 may involve processor 412 adjusting utilization of the first-capacity decoder and the second-capacity decoder in response to the receiving of the high-layer signaling. In some implementations, in adjusting the utilization of the first-capacity decoder and the second-capacity decoder, process 500 may involve processor 412 switching utilization of the second-capacity decoder and the first-capacity decoder by performing either of the following: (1) disabling the second-capacity decoder and enabling the first-capacity decoder to perform decoding using the first-capacity decoder; or (2) enabling the second-capacity decoder and disabling the first-capacity decoder to perform decoding using the second-capacity decoder.

Alternatively or additionally, process 500 may involve processor 412 performing other operations. For instance, process 500 may involve processor 412 receiving, via modem 416 from network apparatus 420, high-layer signaling indicating a number of parameters such as a first duration (e.g., $T_{LARGE}$), a second duration (e.g., $T_{EXP}$) and a total duration (e.g., T). Moreover, during the total duration, process 500 may involve processor 412 performing a number of operations. Specifically, process 500 may involve processor 412 enabling the second-capacity decoder for at least the first duration. Process 500 may also involve processor 412 determining whether any second data destined for the UE is to be received during the first duration or the second duration following the first duration and that a size of the second data is greater than the first data size. Process 500 may further involve processor 412 decoding the second data using the second-capacity decoder upon a determination that the second data is to be received during the first duration or the second duration. Additionally, process 500 may involve processor 412 continuing to decode the second data using the second-capacity decoder when the second data is also to be received after the first duration and the second duration.

In some implementations, process 500 may involve processor 412 performing other operations. For instance, process 500 may involve processor 412 computing a third duration (e.g., $T_{SMALL}$) as a difference between the total duration and a sum of the first duration and the second duration. Additionally, during the total duration, process 500 may involve processor 412 performing a number of operations. In particular, process 500 may involve processor 412 enabling the first-capacity decoder and disabling the second-capacity decoder responsive to a determination that the second data is not to be received during the first duration or the second duration and that the size of the second data is no greater than the first data size. Moreover, process 500 may involve processor 412 decoding the second data using the first-capacity decoder as the second data is received during the third duration.

In some implementations, process 500 may involve processor 412 switching between the first-capacity decoder and the second-capacity decoder to decode further data destined for the UE based on: (1) total amount of data in the CVC, the control information contained in the CVC, a semi-static configuration in the CVC, or a combination thereof in an event that no DVC is received, or (2) total amount of data in the DVC, the control information contained in the DVC, a semi-static configuration in the DVC, or a combination thereof in an event that the DVC is received.

In some implementations, the semi-static configuration in the CVC may include an explicit restriction or an implicit restriction on data size. The implicit restriction may specify a maximal modulation order and/or a maximal spatial layer number in a virtual carrier configuration. The explicit restriction may indicate whether the first-capacity decoder or the second-capacity decoder is to be used per virtual carrier.

In some implementations, the semi-static configuration in the DVC may include an explicit restriction or an implicit restriction on data size. The implicit restriction may specify either or both a maximal modulation order and a maximal spatial layer number in a virtual carrier configuration. The explicit restriction may indicate whether the first-capacity decoder or the second-capacity decoder is to be used per virtual carrier.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an", e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of a modem of a user equipment (UE) configured with at least a first-capacity decoder and at least a second-capacity decoder, a common virtual carrier (CVC), a dedicated virtual carrier (DVC), or both, wherein:
        the CVC contains common information shared by a plurality of UEs in a network, control information for the UE, data information related to first data destined for the UE, or a combination thereof,
        the DVC contains control information for the UE, the first data, or a combination thereof,
        the first-capacity decoder is capable of decoding data of a first data size up to a first data rate,
        the second-capacity decoder is capable of decoding data of a second data size up to a second data rate,
        the second data size is greater than the first data size, and
        the second data rate is greater than the first data rate; and
    determining, by the processor, whether to decode the first data using the first-capacity decoder or to decode the first data using the second-capacity decoder based on the data information or the control information.

2. The method of claim 1, wherein the CVC comprises a block of physically contiguous radio frequency (RF) resources within a component carrier, wherein the common information in the CVC comprises one or more beacon signals, system information, common physical layer control information, dedicated control information, data, or a combination thereof, and wherein the DVC is configurable by radio resource control (RRC)-layer signaling.

3. The method of claim 1, wherein the determining whether to decode the first data using the first-capacity decoder or to decode the first data using the second-capacity decoder comprises, for each time period of a plurality of consecutive time periods, performing operations comprising:
    enabling the second-capacity decoder for a first duration; and performing at least one of:
  decoding the first data using the second-capacity decoder responsive to a determination that a size of the first data is greater than the first data size;
  disabling the second-capacity decoder at an end of a second duration that follows the first duration responsive to a determination that a size of the first data is not greater than the first data size; and
  continuing to use the second-capacity decoder to decode second data responsive to a determination during the second duration that a size of the second data is greater than the first data size.

4. The method of claim 3, wherein the determining whether to decode the first data using the first-capacity decoder or to decode the first data using the second-capacity decoder further comprises:
  following the disabling of the second-capacity decoder at the end of the second duration, determining whether third data, destined for the UE and received by the UE after receiving the first data, has a size greater than the first data size; and
  performing either of:
    enabling the second-capacity decoder to decode the third data responsive to a determination that there is the third data destined for the UE with a size greater than the first data size; or
    decoding the third data using the first-capacity decoder responsive to a determination that the size of the third data is not greater than the first data size.

5. The method of claim 1, further comprising:
  performing either of:
    enabling, by the processor, the first-capacity decoder to decode the first data responsive to a determination to decode the first data using the first-capacity decoder based on the data information indicating a size of the first data less than the first data size; or
    enabling, by the processor, the second-capacity decoder to decode the first data responsive to a determination to decode the first data using the second-capacity decoder based on the data information indicating a size of the first data greater than the first data size.

6. The method of claim 1, further comprising:
  receiving, by the processor, a dedicated virtual carrier (DVC) containing the first data destined for the UE; and
  determining, by the processor, whether to decode the DVC using the first-capacity decoder or to enable the second-capacity decoder to decode the first data using the second-capacity decoder based on the data information or the control information.

7. The method of claim 6, wherein the first-capacity decoder either shares a common part of a physical resource with the second-capacity decoder or is a portion of the second-capacity decoder.

8. The method of claim 6, further comprising:
  receiving, by the processor, high-layer signaling indicating a change in the CVC, the DVC, or both; and
  adjusting, by the processor, utilization of the first-capacity decoder and the second-capacity decoder responsive to the receiving of the high-layer signaling.

9. The method of claim 8, wherein the adjusting of the utilization of the first-capacity decoder and the second-capacity decoder comprises:
  switching utilization of the second-capacity decoder and the first-capacity decoder by performing either of:
    disabling the second-capacity decoder and enabling the first-capacity decoder to perform decoding using the first-capacity decoder; or
    enabling the second-capacity decoder and disabling the first-capacity decoder to perform decoding using the second-capacity decoder.

10. The method of claim 1, further comprising:
  receiving, by the processor from the network, high-layer signaling indicating a plurality of parameters comprising a first duration, a second duration and a total duration; and
  during the total duration, performing, by the processor, operations comprising:
    enabling the second-capacity decoder for at least the first duration;
    determining whether any second data destined for the UE is to be received during the first duration or the second duration following the first duration and that a size of the second data is greater than the first data size;
    decoding the second data using the second-capacity decoder upon a determination that the second data is to be received during the first duration or the second duration; and
    continuing to decode the second data using the second-capacity decoder when the second data is also to be received after the first duration and the second duration.

11. The method of claim 10, further comprising:
  computing, by the processor, a third duration as a difference between the total duration and a sum of the first duration and the second duration; and
  during the total duration, performing, by the processor, operations comprising:
    enabling the first-capacity decoder and disabling the second-capacity decoder responsive to a determination that the second data is not to be received during the first duration or the second duration and that the size of the second data is no greater than the first data size; and
    decoding the second data using the first-capacity decoder as the second data is received during the third duration.

12. The method of claim 1, further comprising:
  switching, by the processor, between the first-capacity decoder and the second-capacity decoder to decode further data destined for the UE based on:
    total amount of data in the CVC, the control information contained in the CVC, a semi-static configuration in the CVC, or a combination thereof in an event that no DVC is received, or
    total amount of data in the DVC, the control information contained in the DVC, a semi-static configuration in the DVC, or a combination thereof in an event that the DVC is received.

13. The method of claim 12, wherein the semi-static configuration in the CVC comprises an explicit restriction or an implicit restriction on data size, wherein the implicit restriction specifies either or both of a maximal modulation order and a maximal spatial layer number in a virtual carrier configuration, and wherein the explicit restriction indicates whether the first-capacity decoder or the second-capacity decoder is to be used per virtual carrier.

14. The method of claim 12, wherein the semi-static configuration in the DVC comprises an explicit restriction or an implicit restriction on data size, wherein the implicit restriction specifies either or both of a maximal modulation order and a maximal spatial layer number in a virtual carrier configuration, and wherein the explicit restriction indicates whether the first-capacity decoder or the second-capacity decoder is to be used per virtual carrier.

15. An apparatus, comprising:
a modem capable of receiving and transmitting signals representative of information and data, the modem comprising at least a first-capacity decoder and at least a second-capacity decoder, the first-capacity decoder capable of decoding data of a first data size up to a first data rate, the second-capacity decoder capable of decoding data of a second data size up to a second data rate, the second data size greater than the first data size, the second data rate greater than the first data rate; and
a processor coupled to control operations of the modem, the processor capable of performing operations comprising:
receiving, via the modem from a network, a common virtual carrier (CVC), a dedicated virtual carrier (DVC), or both, wherein:
the CVC contains common information shared by a plurality of UEs in the network, control information for the UE, data information related to first data destined for the UE, or a combination thereof, and
the DVC contains control information for the UE, the first data, or a combination thereof; and
determining whether to decode the first data using the first-capacity decoder or to decode the first data using the second-capacity decoder based on the data information or the control information.

16. The apparatus of claim 15, wherein the CVC comprises a block of physically contiguous radio frequency (RF) resources within a component carrier, wherein the common information in the CVC comprises one or more beacon signals, system information, common physical layer control information, dedicated control information, data, or a combination thereof, and wherein the DVC is configurable by radio resource control (RRC)-layer signaling.

17. The apparatus of claim 15, wherein, in determining whether to decode the first data using the first-capacity decoder or to decode the first data using the second-capacity decoder, the processor performs, for each time period of a plurality of consecutive time periods, operations comprising:
enabling the second-capacity decoder for a first duration; and
performing at least one of:
decoding the first data using the second-capacity decoder responsive to a determination that a size of the first data is greater than the first data size;
disabling the second-capacity decoder at an end of a second duration that follows the first duration responsive to a determination that a size of the first data is not greater than the first data size; and
continuing to use the second-capacity decoder to decode second data responsive to a determination during the second duration that a size of the second data is greater than the first data size.

18. The apparatus of claim 17, wherein, in determining whether to decode the first data using the first-capacity decoder or to decode the first data using the second-capacity decoder, the processor further performs operations comprising:
following the disabling of the second-capacity decoder at the end of the second duration, determining whether third data, destined for the UE and received by the UE after receiving the first data, has a size greater than the first data size; and
performing either of:
enabling the second-capacity decoder to decode the third data responsive to a determination that there is the third data destined for the UE with a size greater than the first data size; or
decoding the third data using the first-capacity decoder responsive to a determination that the size of the third data is not greater than the first data size.

19. The apparatus of claim 15, whether the processor is further capable of performing either of:
enabling, by the processor, the first-capacity decoder to decode the first data responsive to a determination to decode the first data using the first-capacity decoder based on the data information indicating a size of the first data less than the first data size; or
enabling the second-capacity decoder to decode the first data responsive to a determination to decode the first data using the second-capacity decoder based on the data information indicating a size of the first data greater than the first data size.

20. The apparatus of claim 15, wherein the processor is further capable of performing operations comprising:
receiving, via the modem, a dedicated virtual carrier (DVC) containing the first data destined for the UE; and
determining whether to decode the DVC using the first-capacity decoder or to enable the second-capacity decoder to decode the first data using the second-capacity decoder based on the data information or the control information.

* * * * *